United States Patent
Sugahara

(10) Patent No.: US 7,236,955 B2
(45) Date of Patent: Jun. 26, 2007

(54) METHOD FOR STRUCTURING A TRANSACTION

(75) Inventor: James Takeshi Sugahara, Long Island City, NY (US)

(73) Assignee: Goldman Sachs & Co., New York, NY (US)

( * ) Notice: Subject to any disclaimer, the term of this patent is extended or adjusted under 35 U.S.C. 154(b) by 1284 days.

(21) Appl. No.: 09/883,001

(22) Filed: Jun. 15, 2001

(65) Prior Publication Data

US 2002/0194109 A1 Dec. 19, 2002

(51) Int. Cl.
*G06Q 40/00* (2006.01)

(52) U.S. Cl. .......................................... 705/37; 705/35

(58) Field of Classification Search ............. 705/35–40
See application file for complete search history.

(56) References Cited

U.S. PATENT DOCUMENTS

| | | | |
|---|---|---|---|
| 5,826,243 A | 10/1998 | Musmanno et al. | |
| 5,911,136 A | 6/1999 | Atkins | |
| 5,963,923 A * | 10/1999 | Garber | 705/37 |
| 6,226,623 B1 | 5/2001 | Schein et al. | |
| 6,922,677 B1 * | 7/2005 | Sperandeo | 705/36 R |

OTHER PUBLICATIONS

John Downes. "Dictionary of Finance and Investment Terms." 1998. Barrons Educational Series, Inc, Fifth Edition, pp. 612-613.*
Gregory May. "Flying on instruments: Synthetic investment and the avoidance of withholding tax." Derivatives Quarterly. New York: Summer 1997. vol.3, Iss. 4; pp. 23.*
Chuck Paustian. "Hedge Strategy Gains Attention." Pensions & Investment Age. Chicago: Sep. 1, 1986. vol. 14, Iss. 19; pp. 53, 2 pages.*
Robert W. Greenleaf. "Synthetic Instruments." Financial Analysts Journal; Mar./Apr. 1989; 45, 2; ABI/INFORM Global. pp. 71.*
Robert Winnet "Free way to play the market." Sunday Times. London (UK): Jan. 16, 2000. pp. 5.*

* cited by examiner

*Primary Examiner*—Richard E. Chilcot, Jr.
*Assistant Examiner*—Timothy Harbeck
(74) *Attorney, Agent, or Firm*—Greenberg Traurig, LLP

(57) ABSTRACT

In one embodiment, a method for structuring a transaction between a first party having a long position in a security and a second party is provided. In another embodiment, a method for structuring a transaction involving a first party having a long position in a security, a second party acting as a transaction facilitator, and a third party desiring to acquire short exposure to the security is provided.

12 Claims, 6 Drawing Sheets

METHOD FOR STRUCTURING A TRANSACTION

FIELD OF THE INVENTION

In one embodiment, the present invention relates to a method for structuring a transaction between a first party having a long position in a security and a second party. In another embodiment, the present invention relates to a method for structuring a transaction involving a first party having a long position in a security, a second party acting as a transaction facilitator, and a third party desiring to acquire short exposure to the security.

BACKGROUND OF THE INVENTION

Traditional stock loan transactions are typically carried out for a number of reasons, including tax purposes, hedge purposes, and "short" sale purposes. A "short" sale is the sale of a security which is not owned by the seller with the expectation that the seller will buy the security at a later date to "close out" the short position (as opposed to a simple sale of a security owned by a seller having a "long" position in the security). A short sale generates short exposure to the party making the short sale.

FIG. 1 shows a cash flow diagram of such a traditional stock loan transaction. As seen in this FIG. 1, a Lender 101 loans one or more Securities 103 to a Borrower 105 (such as a broker) and receives Collateral 107 in return. In addition, the Lender 101 pays to the Borrower 105 a Rebate 109 (i.e., a predetermined amount which may be paid periodically and which may be a percentage of the value of the Collateral 107), and the Borrower 105 pays to the Lender 101 an In-Lieu-Of Dividend 111 (i.e., a manufactured amount calculated to substantially mirror any dividends paid on the Securities 103 lent to the Borrower 105 during the term of the loan). Further, the loan has associated therewith a Mark-To-Market Payment 113 (i.e. "marking a security to market" and then making a payment from the first party to the second party or from the second party to the first party, depending upon the price of the security at the time the security is "marked-to-market"). The Mark-To-Market Payment 113 is made periodically (traditionally daily) and is based on the current price of the underlying Securities 103. The purpose of the Mark-To-Market Payment 113 is to obtain a collateral payment between the Borrower 105 and the Lender 101. Thus, the Mark-To-Market Payment 113 may be made from the Lender 101 to the Borrower 105 or from the Borrower 105 to the Lender 101, depending upon the price of the Securities 103 at the time the periodic Mark-To-Market operation is carried out. Specifically, the Mark-to-Market Payment is paid according to the following calculation: at the first point in time ("t"), the Mark-To-Market Payment is equal to: (1) the value of the security at the point in time the security was lent minus (2) the current value of the security at time t. At the next point in time (t+1), the Mark-To-Market Payment is equal to: (1) the value of the security at time t+1 minus (2) the value of the security at time t. A similar calculation continues for each periodic Mark-To-Market Payment.

In a related type of traditional transaction, such as shown in FIGS. 2A–2C, short synthetic exposure is shown. Short synthetic exposure means exposure that reflects an equivalence to the financial exposure generated by a short sale and typically employs derivatives. Short sales are typically used in trading strategies where investors seek to generate positive returns when securities are dropping in value. There are four general types of trading strategies: (1) arbitrage; (2) hedging; (3) directional short selling; and (4) financing. Further, there may be other more complex strategies that incorporate elements of the basic strategies (e.g., tax trades, complex derivative trades, etc). More particularly, as seen in FIG. 2A, if a Broker 201 maintained a long position in a desired security, such as Stock 203, the Broker 201 (via a trader) could enter into the long side of a short synthetic exposure transaction (via TRR Swap 205) with the Hedge Fund 207 and sell the appropriate number of shares of Stock 203.

On the other hand, if the Broker 201 did not have the required underlying position, then generating the short synthetic exposure generally involved two steps. As seen in FIG. 2B, the Broker 201 (via the trader) would first buy the Stock 203 from an Investor 209 and enter into the short side of the synthetic with the same Investor 209 (via Total Rate of Return Swap "TRR Swap" 211). In step two, seen in FIG. 2C, the Broker 201 (via the trader) would then enter into the long side of a synthetic with the Hedge Fund 207 (via TRR Swap 205) and also sell the appropriate number of shares of Stock 203 (similar to selling from a long "proprietary" position).

The above described traditional transaction suffers many of the following disadvantages:

1) There are multiple levels of purchases and sales, generating transactions taxes, stamp taxes and broker fees and commissions.
2) The transaction may expose the broker to foreign exchange risk. For example, if currency controls were implemented, it is possible that the broker could not repatriate the cash proceeds of the sale, or generate local currency to "buy-to-hedge" or to "unwind" (e.g., reverse) the transaction. "Buy-to-hedge" refers to the purchase of an asset (e.g., property or a security (including a stock or a derivative, for example) ) to hedge an exposure in the opposite direction. Further, the transaction may involve underlying stock or it may involve a derivative or other instrument. For example, a trader may have short exposure in a convertible bond that converts into stock. The trader may elect to "buy-to-hedge" the underlying stock of the convertible, in a ratio that correlates with the conversion ratio of the convertible bond.
3) Issues similar to 2 above might arise if the broker were prevented from trading for some reason.
4) The transaction may impact the broker's balance sheet (when the broker acquires the securities the broker is essentially entering into a hedge).
5) The transaction may have significant reg-cap and cash-cap impact (i.e., the transactions may require the broker to use either regulatory capital (i.e., a minimum amount of capital which is required to be maintained to trade on a certain exchange) and/or cash).
6) Unless the transaction is "reset" (by adjusting the swap price after the initial sale by the investor, for example), mark-to-market exposures may arise. For example, if counterparty A was long the synthetic exposure and counterparty B was short the synthetic exposure, if the assets(s) represented by the transaction went up in price, counterparty A would have the risk since counterparty B would have an obligation to pay counterparty A at some point in the future. If the assets(s) went down in price, the opposite would be true.
7) Hedge funds sometimes complain about execution prices. This is because the hedge fund is essentially being "held hostage" to the execution price of the sale by the Investor (e.g., the ultimate swap price may be proportional to the broker's ability to execute the securities trade).

Figure 1:
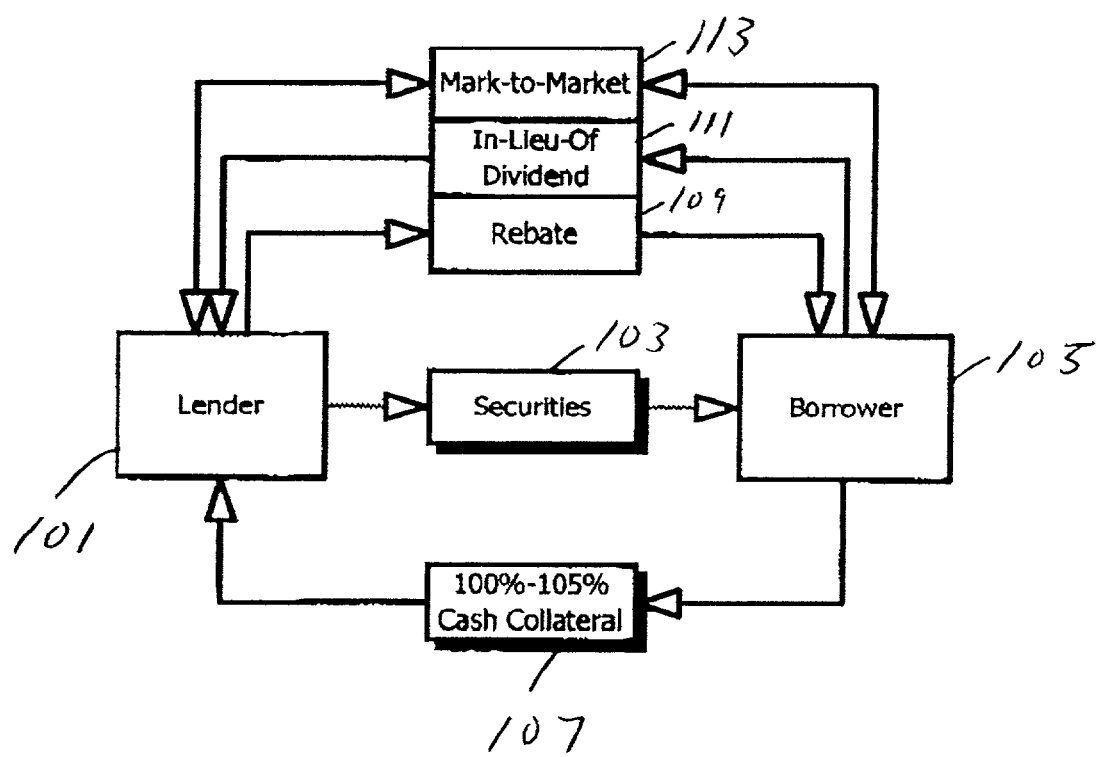
FIG. 1 shows a cash flow diagram of a traditional stock loan transaction.
Figure 2A:
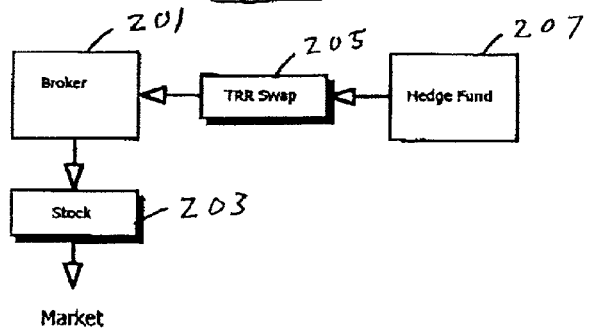
FIGS. 2A–2C show block diagrams of a traditional short synthetic exposure transaction.
Figure 2B:
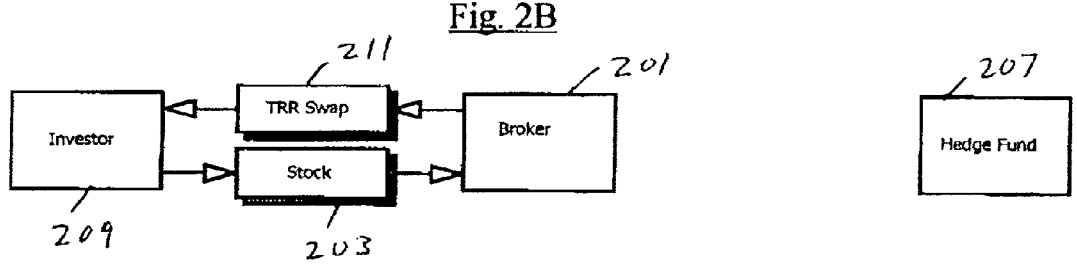
Figure 2C:
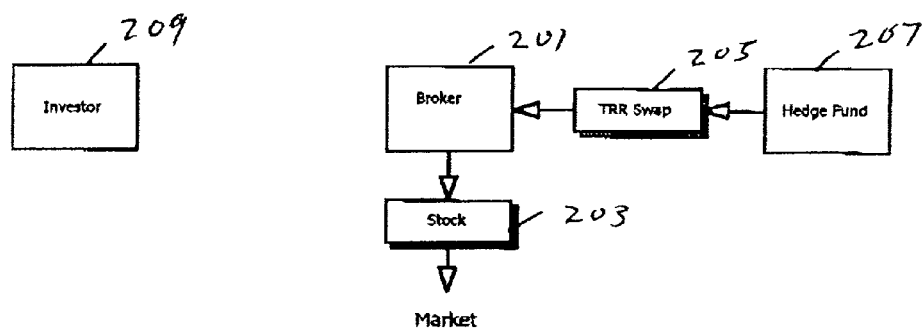

Among those benefits and improvements that have been disclosed, other objects and advantages of this invention will become apparent from the following description taken in conjunction with the accompanying figures. The figures constitute a part of this specification and include an illustrative embodiment of the present invention and illustrate various objects and features thereof.

DETAILED DESCRIPTION OF THE INVENTION

As required, detailed embodiments of the present invention are disclosed herein; however, it is to be understood that the disclosed embodiments are merely illustrative of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In one embodiment a method for structuring a transaction is provided, comprising: selling a security into a market by a first party at a predetermined time; paying interest by the first party to a second party; paying a dividend equivalent by the second party to the first party; periodically marking the security sold by the first party; and arranging an agreement between the second party and a third party, wherein the agreement provides, to the third party, short exposure to the security based upon the sale of the security by the first party.

In one example, the predetermined time may include a predetermined calendar date. The predetermined time may include a predetermined hour. For the purposes of the present application, the term "time" is intended to include, but not be limited to, the point, period, or moment when something occurs, happens, begins, or ends (e.g., a particular hour, minute or second of the day; a particular calendar date; a particular day of the week; a particular week of the year; and a particular year).

The first party may retain the proceeds of the sale of the security.

The interest may be paid periodically using a period selected from the group including, but not limited to: a) daily; b) weekly; c) monthly; d) quarterly; e) semi-annually; and f) annually. In another embodiment, the interest may be paid at the completion of the transaction.

The dividend equivalent may equal at least part of the value of any dividend paid on the security sold by the first party. The dividend equivalent may be paid periodically using a period selected from the group including, but not limited to: a) daily; b) weekly; c) monthly; d) quarterly; e) semi-annually; and f) annually. In another embodiment, the dividend equivalent may be paid at or about the time period which is correlated with the payment of the dividend.

The marking may also include requiring a payment from the first party to the second party or from the second party to the first party, depending upon the price of the security at the time the security is marked-to market. The marking may be carried out in U.S. dollars or other currency deemed appropriate. The marking may be carried out periodically using a period selected from the group including: a) daily; b) weekly; c) monthly; d) quarterly; e) semi-annually; and f) annually.

The security may be selected from the group including: a) at least one fixed income security; b) at least one warrant; c) at least one stock; d) at least one option; e) at least one convertible bond; f) at least one non-convertible bond; and g) at least one future.

The security may be selected from the group including: a) at least one security associated with a single stock issue; b) at least one security associated with a basket of stocks formed of a plurality of stock issues; and c) at least one security associated with a stock index.

The first party may have a long position in the security.

In another embodiment a method for structuring a transaction is provided, comprising: obligating a first party to sell a security into a market at a predetermined time under a first agreement with a second party; and arranging a second agreement between the second party and a third party, wherein the second agreement provides, to the third party, short exposure to the security based upon the sale of the security by the first party.

In one example, the first party may be an institutional investor. The third party may be a hedge fund.

The predetermined time may include a predetermined calendar date. The predetermined time may include a predetermined hour.

The first party may retain the proceeds of the sale of the security.

The security may be selected from the group including: a) at least one fixed income security; b) at least one warrant; c) at least one stock; d) at least one option; e) at least one convertible bond; f) at least one non-convertible bond; and g) at least one future.

The security may be selected from the group including: a) at least one security associated with a single stock issue; b) at least one security associated with a basket of stocks formed of a plurality of stock issues; and c) at least one security associated with a stock index.

The first party may have a long position in the security.

In another embodiment, method for structuring a transaction is provided, comprising: arranging a first agreement between a first party and a second party, wherein the first agreement requires the first party to sell a security into a market; and arranging a second agreement between the second party and a third party, wherein the second agreement provides, to the third party, short exposure to the security based upon the sale of the security by the first party made under the first agreement.

In one example, first party may be an institutional investor. The third party may be a hedge fund.

The first agreement may further comprise requiring the first party to sell the security into the market at a predetermined time. The first agreement may further comprise requiring the first party to pay interest to the second party.

The first agreement may further comprise requiring the second party to pay a dividend equivalent to the first party. The first agreement may further comprise requiring periodic marking of the security sold by the first party.

The predetermined time may include a predetermined calendar date. The predetermined time may include a predetermined hour.

The first party may retain the proceeds of the sale of the security.

The interest may be paid periodically using a period selected from the group including, but not limited to: a) daily; b) weekly; c) monthly; d) quarterly; e) semi-annually; and f) annually In another embodiment, the interest may be paid at the completion of the transaction.

The dividend equivalent may equal at least part of the value of any dividend paid on the security sold by the first party. The dividend equivalent may be paid periodically using a period selected from the group including, but not limited to: a) daily; b) weekly; c) monthly; d) quarterly; e) semi-annually; and f) annually. In another embodiment, the dividend equivalent may be paid at or about the time period which is correlated with the payment of the dividend.

The marking may also include requiring a payment from the first party to the second party or from the second party to the first party, depending upon the price of the security at the time the security is marked-to market. The marking may be carried out in U.S. dollars or other currency deemed appropriate. The marking may be carried out periodically using a period selected from the group including: a) daily; b) weekly; c) monthly; d) quarterly; e) semi-annually; and f) annually.

The security may be selected from the group including: a) at least one fixed income security; b) at least one warrant; c) at least one stock; d) at least one option; e) at least one convertible bond; f) at least one non-convertible bond; and g) at least one future.

The security may be selected from the group including: a) at least one security associated with a single stock issue; b) at least one security associated with a basket of stocks formed of a plurality of stock issues; and c) at least one security associated with a stock index.

The first party may have a long position in the security.

In another embodiment a method for structuring a transaction is provided, comprising: arranging a first agreement between a first party and a second party, wherein the first agreement requires the first party to sell a security into a market at a predetermined time; paying interest by the first party to the second party; paying a dividend equivalent by the second party to the first party; periodically marking the security sold by the first party; and arranging a second agreement between the second party and a third party, wherein the second agreement provides, to the third party, short exposure to the security based upon the sale of the security by the first party made under the first agreement.

In one example, the first party may be an institutional investor. The third party may be a hedge fund.

The predetermined time may include a predetermined calendar date. The predetermined time may include a predetermined hour.

The first party may retain the proceeds of the sale of the security.

The interest may be paid periodically using a period selected from the group including: a) daily; b) weekly; c) monthly; d) quarterly; e) semi-annually; and f) annually.

The dividend equivalent may equal at least part of the value of any dividend paid on the security sold by the first party. The dividend equivalent may be paid periodically using a period selected from the group including: a) daily; b) weekly; c) monthly; d) quarterly; e) semi-annually; and f) annually.

The marking may also include requiring a payment from the first party to the second party or from the second party to the first party, depending upon the price of the security at the time the security is marked-to market. The marking may be carried out in U.S. dollars or other currency deemed appropriate. The marking may be carried out periodically using a period selected from the group including: a) daily; b) weekly; c) monthly; d) quarterly; e) semi-annually; and f) annually.

The security may be selected from the group including: a) at least one fixed income security; b) at least one warrant; c) at least one stock; d) at least one option; e) at least one convertible bond; f) at least one non-convertible bond; and g) at least one future.

The security may be selected from the group including: a) at least one security associated with a single stock issue; b) at least one security associated with a basket of stocks formed of a plurality of stock issues; and c) at least one security associated with a stock index.

The first party may have a long position in the security.

Figure 3:
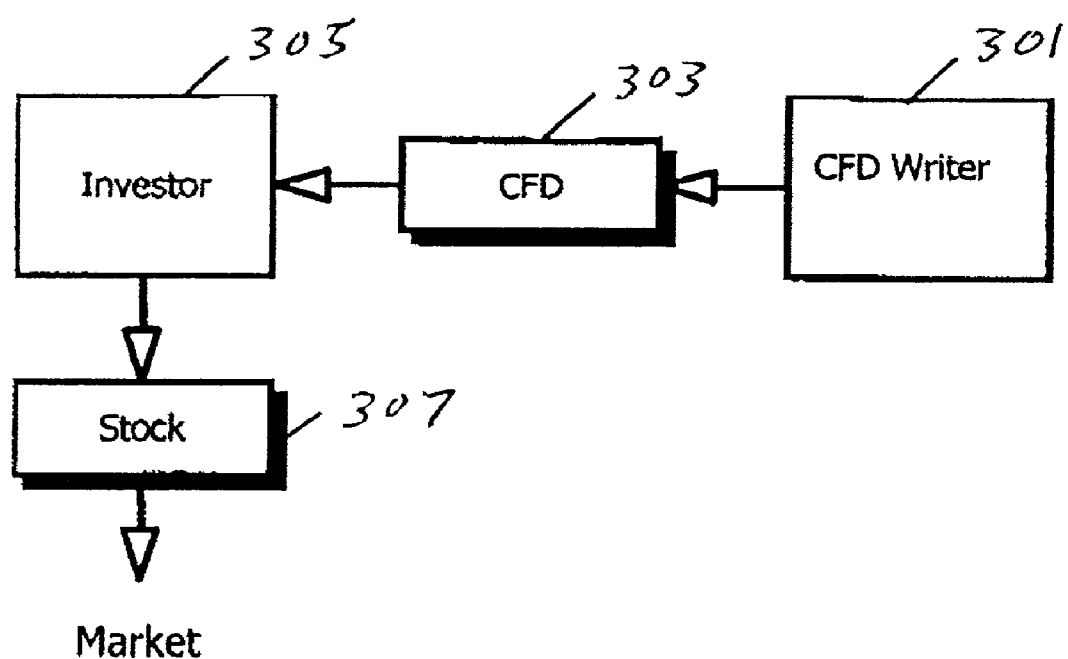
FIG. 3 shows a block diagram of an embodiment of the present invention.

Referring now to FIG. 3, a transaction using a cash settled derivative transaction or contracts-for-differences ("CFD") according to an embodiment of the present invention is shown. This type of transaction will hereinafter be referred to as a CFD Funding/Lending/Leverage ("C-FuLL") transaction. The C-FuLL transaction of this embodiment may be used to synthetically replicate the economics of a securities lending transaction without the need to actually lend the shares. More particularly, the C-FuLL transaction of this embodiment may be used by an investor to: (a) fund a long position; and/or (b) synthetically lend one or more securities; and/or (c) leverage its portfolio of securities.

Still referring to FIG. 3, it is seen that in general terms the C-FuLL transaction of this embodiment may operate as follows. A CFD Writer 301 may write a CFD 303 which, among other things, provides an Investor 305 "long" exposure to Stock 307 (shares of which are sold under the CFD 303 to the market, or local exchange). The "long" exposure may be financial exposure that essentially mirrors the financial exposure generated by a long position in the Stock 307. The date and/or time of the sale of the shares may, of course, be governed by the CFD 303.

More particularly, the mechanics of a C-FuLL transaction according to the present embodiment may operate as follows:

a) The CFD Writer 301, or an agent acting on behalf of CFD Writer 301 (hereinafter collectively "CFD Writer 301") contacts Investor 305, or an agent acting on behalf of Investor 305 (hereinafter collectively "Investor 305"), to determine if the Investor 305 can synthetically "lend" a desired number of shares of Stock 307. If the Investor 305 approves, the "fee" and other terms of the CFD 303 are agreed upon (including the term of the CFD 303 (e.g., expiration date and/or time), any early termination clauses, and the date and time of the proposed sale by the Investor 301 of the Stock 307).

b) Once the terms are agreed to, the CFD Writer 301 may send a confirmation to the Investor 305.

c) On the sale date the Investor 305 reports to the CFD Writer 301 the average execution price of the sale of the shares, at which the CFD 303 itself is priced (i.e., the "strike price" of the CFD 303). If the sale is executed through the CFD Writer 301, there maybe no need to report.

d) On a periodic basis (e.g., daily) the CFD Writer 301 contacts the Investor 305 to confirm and transfer mark-to-market amounts.

e) On the termination date of the C-FuLL, if the Investor 305 repurchases the shares of the Stock 307 then the Investor 305 reports to the CFD Writer 301 the repurchase price (e.g., the average execution price), which is used as the final mark-to-market price. If the purchase is executed through the CFD Writer 301 then there may be no need to report. If the Investor chooses not to repurchase, then a pre-agreed price (e.g., market open, market close, Volume Weighted Average Price "VWAP") may be used as the final mark-to-market price. An example of VWAP is as follows: If 100 shares were sold at 20,200 shares at 25, and 300 shares at 30, VWAP=[(100×20)+(2000×25)+(300×30)]/[100+200+300] =26.67.

f) If the CFD Writer 301 seeks early termination of the C-FuLL, then the CFD Writer 301 may be required to pay a penalty fee to the Investor 305 in a pre-agreed amount. If the Investor 305 seeks early termination of the C-FuLL, then the Investor 305 may be required to pay a penalty fee to the CFD Writer 301 in a pre-agreed amount. Following traditional stock loan conventions, the early termination date may be one settlement cycle from the date of notification (the date and time of the early termination following the notification may, of course, be any agreed date and time).

Figure 4:
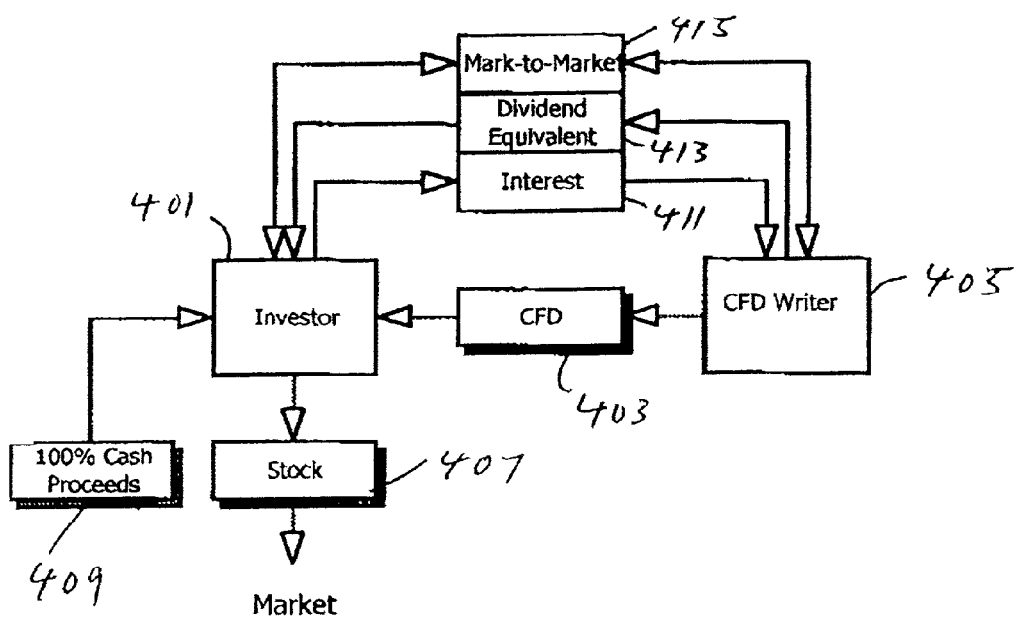
FIG. 4 shows a cash flow diagram of an embodiment of the present invention.

Referring now to FIG. 4, a cash flow diagram of a C-FuLL transaction of the present embodiment is shown. As seen in this FIG. 4, an Investor 401 enters into CFD 403 with CFD Writer 405. The Investor 401 sells Stock 407 under the CFD 403 into the market and receives the Proceeds 409 from the sale. In addition, the Investor 401 pays to the CFD Writer 405 Interest 411 (at a rate and period specified by the CFD 403) and the CFD Writer 405 pays to the Investor 401 a Dividend Equivalent 413 (i.e., an amount embedded in the cash flow which essentially tracks any dividends paid by the Stock 407 which is sold by the Investor 401). Further, the synthetic loan is periodically marked-to-market (e.g., on a daily basis) based on the price of the underlying Stock 407 (wherein a Mark-To-Market Payment 415 may be made from the Investor 401 to the CFD Writer 405 or from the CFD Writer 405 to the Investor 401, depending upon the price of the Stock 407 at the time the periodic mark-to-market operation is carried out).

Of note is the fact that the cash flow of the C-FuLL transaction of the present embodiment shown in FIG. 4 is structured to substantially mirror the cash flow of the traditional stock loan transaction of FIG. 1, a well understood and utilized transaction. More particularly, the Proceeds 409 essentially mirror the Collateral 107, the Interest 411 essentially mirrors the Rebate 109, the Dividend Equivalent 413 essentially mirrors the In-Lieu-Of Dividend 111, and the Mark-To-Market Payment 415 essentially mirrors the Mark-To-Market Payment 113.

Also of note is the fact that while the long sale by the Investor 401 could trigger a tax event, while the execution and settlement of the initial sale and/or subsequent repurchase may give rise to dealing expenses, commissions and brokerage fees, while repatriation of the proceeds of the sale may be subject to foreign exchange restrictions, withholding, or other taxes, while it may be difficult if not impossible for the Investor 401 to repurchase the Stock 407 (foreign ownership limits or other restrictions on foreign investment may arise or there may be insufficient market liquidity), and while CFD's may carry no voting rights, the following additional potential benefits are provided by the C-FuLL transaction of the present embodiment:

a) Ability to "lend" or fund in markets where lending is otherwise not possible due to regulatory or tax concerns (this may be especially attractive in markets where securities, dealing, foreign ownership, and/or foreign exchange restrictions have not allowed a securities lending market to develop).

b) Unencumbered use of cash proceeds generated from the sale. An Investor can view this as a funding transaction, or if the Investor uses the sales proceeds to buy other securities, a form of leverage transaction.

c) Attractive funding rates.

d) Term transactions for a pre-agreed period of time. Early terminations by either party can occur, with penalty. "Recalls" by the Investor 401 may follow the stock loan format.

e) No buy-in risk for sales of a "lent" position. Position is already sold and settled.

f) Credit exposure to CFD Writer 405 is limited through the mark-to-market process.

Figure 5:
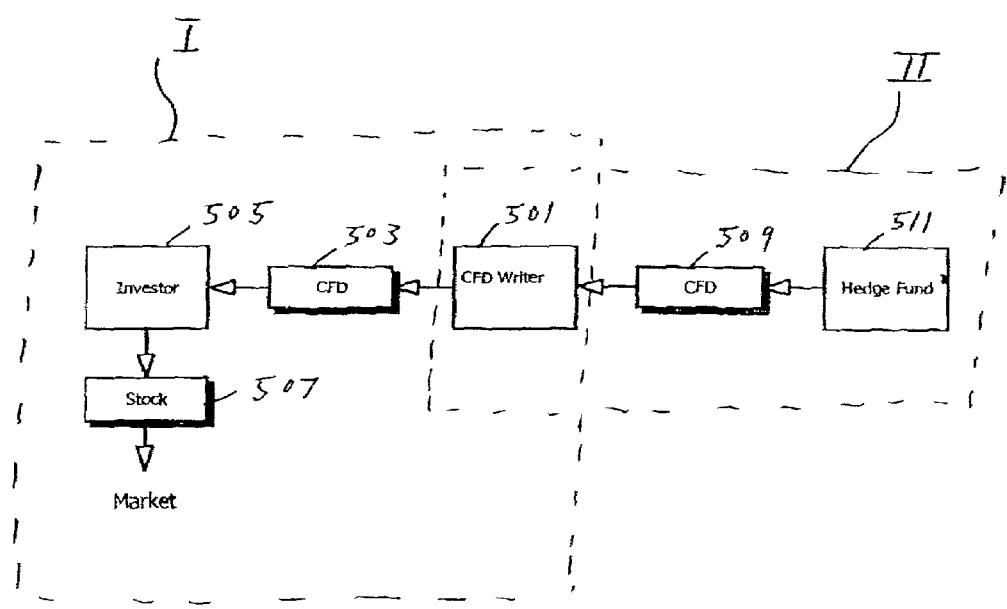
FIG. 5 shows a block diagram of an embodiment of the present invention.

Referring now to FIG. 5, a block diagram of a Short Synthetic Market Access Trade ("SSMAT") according to another embodiment of the present invention is shown. While there are numerous markets in which actual short selling is not possible (whether due to legal/regulatory issues, tax issues, cost, lack of stock transfer mechanisms, and/or reputational concerns that relate either to short selling or borrowing stock), the SSMAT of the present embodiment permits the generation of short synthetic exposure (e.g., financial exposure that essentially mirrors the financial exposure generated by a short sale) without the need to actually borrow or short the stock. Moreover, although this example describes a Hedge Fund, it is understood that the present invention applies to any counterpart desiring to gain a short exposure (e.g. individual or group).

In general terms, the SSMAT of the present embodiment is essentially a back-to-back CFD with a timed sale, where the CFD Writer pre-arranges the sale of stock by a "long" Investor at a given date and time.

More particularly, as seen in the section of FIG. 5 labeled I (which is essentially the C-FuLL embodiment of FIG. 3), a CFD Writer 501 writes a CFD 503 (which could be a non-collateral CFD, for example) with an Investor 505 to pre-arrange the sale of Stock 507 by the Investor 505 and to replace the long exposure of the Investor 505 with synthetic exposure (i.e., the synthetic exposure may be financial exposure that essentially mirrors the financial exposure generated by a long position in the Stock 507).

Further, as seen in the section of FIG. 5 labeled II, the CFD Writer 501 writes CFD 509 (which could be a non-collateral CFD, for example) with Hedge Fund 511 to pass to the Hedge Fund 511 the short synthetic exposure generated by the CFD 503.

Still referring to FIG. 5, the mechanics of an SSMAT transaction according to the present embodiment may operate as follows:

a) The Hedge Fund 511 (or its agent, collectively referred to as "Hedge Fund 511") contacts the CFD Writer 501 (or its agent, collectively referred to as "CFD Writer 501") for short synthetic exposure. To minimize the number of transactions, the CFD Writer 501 may ask the Hedge Fund 511 what its maximum expected short exposure is. The "fee" and other terms of the CFD 509 are agreed upon, including term (e.g., expiration date and/or time) and any early termination penalties.

b) The CFD Writer 501 finds a "lending" counterpart (i.e., Investor 505 (or its agent, collectively referred to as "Investor 505")). Once identified, the CFD Writer 501 and the counterpart negotiate the terms of the CFD 503, including the rate and period of interest to be paid by the counterpart, the time period (e.g. date and/or time) of the sale, the term (e.g., expiration date and/or time), and any early termination penalties.

c) The CFD Writer 501 contacts the Hedge Fund 511 to convey the date and time of the proposed sale (and the Hedge Fund 511 may be given the option of approving or disapproving). If the Hedge Fund 511 approves, the final share quantity represented by the CFD 509 may be determined by the share quantity sold by the "lending" counterpart. Further, the initial price of the CFD 509 (i.e., the "strike" price) may be set to the average price of the shares sold. In markets that allow "crossing", the CFD Writer 501 may provide the Hedge Fund 511 with the option to cross (or the Hedge Fund 511 may be required to cross). In one example, a "crossing" may occur when a broker receives two opposite orders that it can match. If, for example, the broker receives a buy order for 100,000 shares of a stock and also receives a sell order for 100,000 shares of the same stock, then in certain exchanges the broker can execute a cross trade between the buy and the sell and then report the transaction to the exchange. The same option/requirement to cross may be applied to the transaction "unwind". Where crossing is not required and/or possible, the Hedge Fund 511 may be notified of the proposed time of the sale by the "lending" counterpart to allow the Hedge Fund 511 to provide the natural buy-side of the sale. Again, the same may occur for the "unwind" portion of the transaction. Further still, Hedge Fund 511 may adjust its short exposure by either buying or selling stock in the market. Moreover, the CFD 509 may be booked into an account associated with Hedge Fund 511, transactions may appear on any account statements, marking may be performed periodically (e.g., daily), and a margining process may be provided. It is noted that hedge funds often prefer to "short" at their own discretion, and large market-open/close sales could significantly impact pricing. Thus, the CFD Writer 501 could urge both counterparts to execute through the CFD Writer 501 itself, so that the CFD Writer 501 would have maximum control over the transaction.

With regard to the cash flow between the parties shown in Section I of FIG. 5, it is noted that the cash flow is essentially the same as that shown in FIG. 4 (with reference to the C-FuLL transaction). In other words, this portion of the cash flow of the SSMAT transaction of the present embodiment is likewise structured to substantially mirror the cash flow of the traditional stock loan transaction of FIG. 1.

Figure 6:
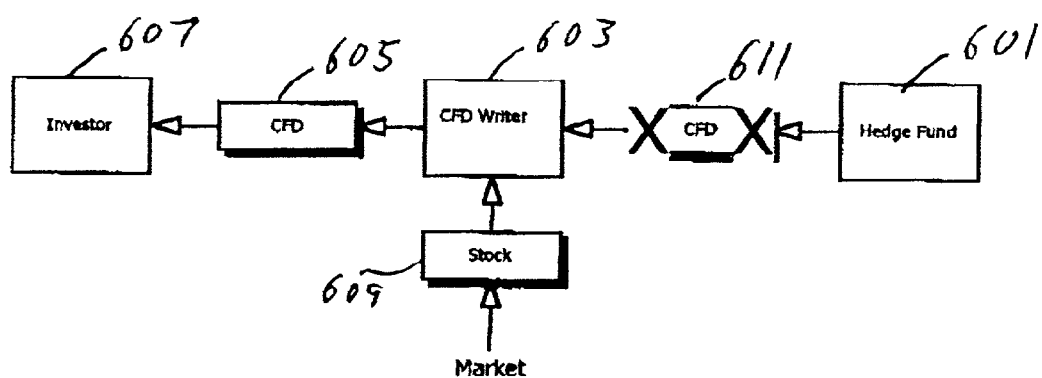
FIG. 6 shows a block diagram of an embodiment of the present invention.

Referring now to FIG. 6, early unwinding of the SSMAT transaction of the present embodiment will now be discussed.

If the Hedge Fund 601 chooses to unwind prior to the agreed upon date and/or time then there may be two options:

1) The CFD Writer 603 may terminate the CFD 605 (i.e., the one facing the Investor 607). If this is done then the CFD Writer 703 may be assessed a penalty owed to the Investor 707 (such penalty could be passed on to the Hedge Fund 701).

2) The CFD Writer 603 may purchase the Stock 609 and terminate the second CFD 611 (i.e., the one facing the Hedge Fund 601) at the purchase cost. The CFD Writer 603 could then write a third CFD (not shown) by selling the long stock position. It is noted that this option introduces some incremental risk to the CFD Writer 603.

On the other hand, if the Investor 607 chooses to unwind prior to the agreed upon date and/or time, then the Investor 607 may be required to: a) provide a one settlement cycle recall period before the CFD 605 is unwound; and b) pay a penalty to the CFD Writer 603 (which may be passed on to the Hedge Fund 601).

It is noted that in some instances a potential Investor (e.g., an Institutional Investor) may not have the appropriate systems and infrastructure in place to participate in a transaction according to the present invention. That is, the potential Investor may not have the systems and infrastructure in place to track mark-to-market, dividend equivalent, and interest payments, for example. Therefore, in another embodiment of the present invention an agent possessing or having access to the appropriate systems and infrastructure may be utilized to "stand in the shoes of" the potential Investor.

Further, it is noted that with regard to participation by certain investors (e.g., Institutional Investors), traditional derivative transactions and/or financing transactions may be governed by various margin regulations and "customer protection" regulations (e.g., Rule 15a-6). In this regard, it is believed that when the CFD's of the instant invention are implemented as non-securities such margin regulations and "customer protection" regulations would not apply (thus providing broader investment options to such investors).

By operating as described above, the present invention provides a mechanism through which a CFD Writer is not involved in the cash side of a transaction (i.e., the CFD Writer is not actually buying or selling stock, as a traditional broker might during a traditional transaction).

Further, since the CFD Writer is not involved in the cash side of a transaction, the present invention provides a mechanism through which the CFD Writer is not exposed to foreign exchange risk, as a traditional broker might be during a traditional transaction (except to the extent that the CFD Writer chooses to hedge the synthetic versus stock).

Further, since the CFD Writer is not involved in the cash side of a transaction, the present invention provides a mechanism through which the CFD Writer is not exposed to the risk of being prevented from trading a security, as a traditional broker might be during a traditional transaction.

Further, since the CFD Writer is not involved in the cash side of a transaction, the present invention provides a mechanism through which the balance sheet of the CFD Writer is not significantly impacted, as can occur to a traditional broker during a traditional transaction.

Further, since the CFD Writer is not involved in the cash side of a transaction, the present invention provides a mechanism through which the CFD Writer is not exposed a significant "reg-cap" and "cash-cap" impact, as can occur to a traditional broker during a traditional transaction.

Further, since the CFD between the Investor and the CFD Writer is marked-to-market periodically (e.g., daily), the CFD Writer does not take on significant mark-to-market exposure, as can occur to a traditional broker during a traditional transaction.

Further, since the party seeking to acquire the short synthetic exposure (e.g., a hedge fund) may be given the opportunity to "cross" or be the natural buy side to the Investor sale, the hedge fund may be able to dictate when to sell shares to provide the short synthetic exposure.

Further, the present invention provides a mechanism through which an investor may embed transaction taxes, stamp taxes, and sales fees and commissions into a CFD and such costs could be passed on to a party acquiring the short synthetic exposure (e.g., a hedge fund).

Further, the present invention provides a mechanism through which an investor "sees" a cash flow which essentially mirrors the cash flow of a traditional securities lending transaction.

While a number of embodiments of the present invention have been described, it is understood that these embodiments are illustrative only, and not restrictive, and that many modifications may become apparent to those of ordinary skill in the art. For example, the present invention may be utilized with a transaction involving one or more shares of a security associated with a single entity, one or more shares of a security associated with a plurality of entities (e.g., a "basket" of securities), or one or more shares of a security associated with an index. Further still, the present invention may be used with multiple Investors and/or multiple Hedge Funds. For example, a number of Investors may be used to provide a desired short synthetic exposure to one Hedge Fund, or number of Hedge Funds may receive the short synthetic exposure provided by one Investor, or a number of Investors may be used to provide a desired short synthetic exposure to a number of Hedge Funds. Further still, the CFD Writer may pre-arrange a number of CFD's with one or more Investors to have an "inventory" of such CFD's ready to match-up with one or more counterpart Hedge Fund CFD's when desired. Further still, the CFD Writer may pre-arrange a number of CFD's with one or more Hedge Funds to have a "inventory" of such CFD's ready to match-up with one or more counterpart Investor CFD's when desired. Further still, the CFD's of the present invention and/or the exposure ("long" and/or "short") generated by the CFD's of the present invention may be placed in "inventory" (maintained by the CFD Writer and/or another entity, such as a clearinghouse) and such inventory may be searched and/or accessed and/or "booked" (e.g., sold) by an appropriate computer system. Further still, the present invention may be utilized for tax arbitrage. Further still, the present invention may be used in a market in which a security can not be sold short (e.g., an "emerging market" such as Taiwan or Indonesia) and/or in a market in which securities lending is not available or possible. Further still, a transaction according to the present invention may require specific documentation, such as a Master International Securities Dealers Association "ISDA" Agreement, a CFD Annex to the ISDA Agreement, and a short form Confirmation for each CFD, for example. Further still, while the "strike" price of the CFD (and the repurchase price thereof) have been described as being the average execution price (of a number of shares of stock), the price could alternatively be the price of a single share of stock (if only one share is sold), the weighted average price of a number of shares of stock (wherein the weighting factor is any desired weighting factor), the highest price of any of the shares sold, the lowest price of any of the shares sold, or any other desired calculated value, for example. Further still, the present invention may be applied to any venue involving the buying and/or selling of one or more assets (i.e., a market). Further still, the mark-to-market calculation and payment, the dividend equivalent payment, and the interest payment according to the present invention may each be carried out at any desired time, such as at pre-arranged calendar dates and/or times' and/or periodically (e.g., daily, weekly, monthly, quarterly, semi-annually, or annually), and/or essentially continuously (e.g., by the split-second, by the second, by the minute, or by the hour in a "real-time" or quasi "real-time" manner). Further still, the CFD Writer may pre-qualify investors and/or hedge funds. The pre-qualification may include determining and/or setting up credit lines. Further still, the early termination date of the CFD may be one settlement cycle from the date of notification, or the early termination date may be any desired time period after the notification. Further still, the present invention may be used with any desired asset(s), including, but not limited to, securities or non-securities (e.g., real estate). Further still, the present invention may be used by any party having a long position in an asset and/or any party desiring to acquire short exposure to the asset and/or any intermediary. For example, the party may be, but not limited to, an individual investor, a corporation, a charitable organization, an investment fund (e.g., a mutual fund), a lending institution, a broker, a dealer, and/or a trust. Further still, the security sold by the first party may be a currency future, for example. Further still, while the present invention has been described principally with respect to a method for structuring a transaction, a corresponding software program and/or system may of course be utilized to structure a transaction, and/or to help to structure a transaction, and/or to carry out one or more steps of the transaction, and/or to help to carry out one or more steps of the transaction.

What is claimed is:

1. A method for structuring a transaction, comprising:
   selling a security into a market by a first party at a predetermined time;
   paying interest by the first party to a second party;
   paying a dividend equivalent by the second party to the first party;
   periodically marking the security sold by the first party to market; and
   arranging an agreement between the second party and a third party, wherein the agreement provides, to the third party, short exposure to the security based upon the sale of the security by the first party;
   wherein the dividend equivalent equals at least part of the value of a dividend paid on the security sold by the first party.

2. The method of claim 1, wherein the predetermined time includes a predetermined calendar date.

3. The method of claim 2, wherein the predetermined time includes a predetermined hour.

4. The method of claim 1, wherein the first party retains the proceeds of the sale of the security.

5. The method of claim 1, wherein the interest is paid periodically using a period selected from the group including: a) daily; b) weekly; c) monthly; d) quarterly; e) semi-annually; f) annually; and g) at the completion of the transaction.

6. The method of claim 1, wherein the dividend equivalent is paid periodically using a period selected from the group including: a) daily; b) weekly; c) monthly; d) quarterly; e) semi-annually; f) annually; and g) at or about the period which is correlated with the payment of the dividend.

7. The method of claim 1 comprising the additional step of making a payment from the first party to the second party or from the second party to the first party, depending upon the price of the security at the time the security is marked-to-market.

8. The method of claim 1, wherein the marking is carried out in U.S. dollars.

9. The method of claim 1, wherein the marking is carried out periodically using a period selected from the group including: a) daily; b) weekly; c) monthly; d) quarterly; e) semi-annually; and f) annually.

10. The method of claim 1, wherein the security is selected from the group including: a) at least one fixed income security; b) at least one warrant; c) at least one stock; d) at least one option; e) at least one convertible bond; f) at least one non-convertible bond; and g) at least one future.

11. The method of claim 1, wherein the security is selected from the group including: a) at least one security associated with a single stock issue; b) at least one security associated with a basket of stocks formed of a plurality of stock issues; and c) at least one security associated with a stock index.

12. The method of claim 1, wherein the first party has a long position in the security.

* * * * *